Figure 1:
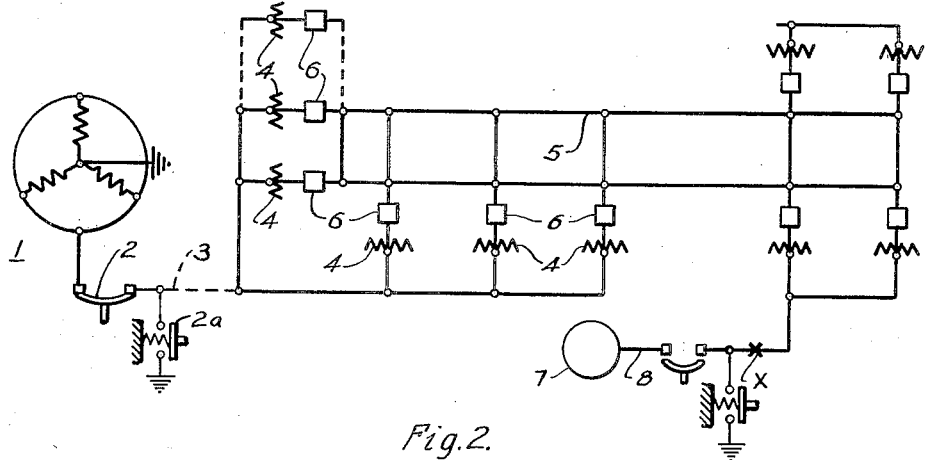

Nov. 12, 1940.                 J. S. PARSONS                       2,221,602
                         NETWORK SYSTEM OF DISTRIBUTION
                              Filed March 30, 1939

WITNESSES:                                              INVENTOR
N. F. Susser.                                        John S. Parsons.
Thos. C. Groome                                      BY
                                                        Waltman
                                                        ATTORNEY Patented Nov. 12, 1940

2,221,602

UNITED STATES PATENT OFFICE 2,221,602

NETWORK SYSTEM OF DISTRIBUTION

John S. Parsons, Swissvale, Pa., assignor to Westinghouse Electric & Manufacturing Company, East Pittsburgh, Pa., a corporation of Pennsylvania Application March 30, 1939, Serial No. 264,933

13 Claims. (Cl. 175—294)

My invention relates to alternating-current distribution systems, and particularly to such systems of the network type, in which a plurality of distribution circuits are connected together to form a distribution network which is supplied by means of a plurality of feeders. In such systems, whether of the low-voltage or medium-voltage types known in the art, a number of stepdown polyphase transformers or banks of single phase transformers are connected between each feeder and the network, and network protectors or automatic switches are connected between the secondary leads of each polyphase transformer or bank of transformers and the network.

It has heretofore been the practice, in such systems to provide power directional relay apparatus as part of each network protector, for tripping the network circuit breaker upon the occurrence of power flow from the network to the feeder, and for reclosing the network breaker upon the occurrence of such a relationship of feeder and network voltages as to insure power flow from the feeder to the network immediately after the reclosure of the network breaker. In most cases, in order to permit the entire disconnection of an individual feeder at times of light load or when a single line-to-ground fault occurs on a system using transformers with their primaries connected in delta, it has also been the practice to adjust the power-directional network relays to respond to a reverse power flow of comparatively low value, for example, 0.5% of normal full load, so that upon opening the feeder circuit breaker, the reverse power flow occasioned by magnetizing losses to the network transformers would be sufficient to effect operation of the network relays to open the network breaker and to disconnect the feeder from the network.

With such a sensitive reverse power adjustment, it has been necessary to make an accurate comparison of feeder and network voltages, as to both magnitude and phase position, in order to insure closure of the network circuit breaker only under proper system condition. The operation of comparing feeder and network voltages is termed "phasing" and accomplishes the following two things. First, it prevents the closure of the network circuit breakers in the event that any conductors of the feeder have been transposed or incorrectly connected in repairing a feeder fault. In the absence of such phasing protection, such a reclosure would create a dangerous condition on the system, which probably could not be cleared by the network protectors and feeder breakers.

Second, the phasing operation serves to prevent repeated opening and closing, or "pumping," of the network protectors, in the event that both the feeder and network were energized, but the relationship of the feeder and the network voltages were such that, upon closure of the protectors, power would flow in the reverse direction through them. The phasing operation of the usual network master relay is often insufficient alone to prevent pumping, and it may be necessary to add an additional phasing relay to protectors in some network systems to limit the range of feeder voltages, as compared to network voltage, within which reclosure can take place.

In order to meet the requirements of accurate measurement of power flow and accurate comparison of voltages necessary in the system described above, as well as to permit reclosure of the protectors when the network is either totally deenergized or normally energized, a rather complicated and expensive form of network protector is necessary.

As alternatives to the sensitive power-directional arrangement described above, a number of simplified systems have been proposed. According to one such system, it is proposed to reclose the protectors in response to feeder voltage only, and to provide means for locking a protector circuit breaker in open position, after it has been opened, until the feeder is completely deenergized. In this way pumping may be avoided, as the protectors first to open cannot be set or prepared to reclose until all the other protectors connected to the feeder have opened. However, this arrangement provides no protection against crossed-phase connections, and it would be necessary, after repairing a feeder fault, to block open all of the protectors supplied from the feeder before closing the main feeder breaker at the power station. The voltages across a number of the open protectors would then be checked by means of a voltmeter before putting the feeder back into service, to check whether the feeder conductors had been properly reconnected.

In order to avoid the necessity for the checking operation, I provide a simple relay arrangement to determine the condition of the feeder circuit and of the transformer, in order to permit the closing of the network circuit breaker to reconnect the transformer to the network only when the feeder circuit and the transformer are in sound condition and are free of transposed or rotated conductors relative to the corresponding conductors of the network.

In this simplified system I utilize a ground relay that is electrostatically or otherwise coupled to one conductor of the high tension feeder to the transformer, according to the principles disclosed in United States Patent No. 2,020,931 of M. A. Bostwick et al., assigned to the Westinghouse Electric & Manufacturing Company. Since this ground relay is employed to detect a faulty ground condition on the feeder, as well as an arbitrary artificial ground condition purposely imposed to operate the network circuit breakers of that feeder, it is a further object of my invention to prevent attempted closure of any network circuit breaker when the feeder and the transformer are normally sound, if the ground-detecting relay has become non-operative due to some internal defects such as an open circuit.

An additional object of my invention, therefore, is to provide a protective lockout feature that will prevent closure of the network circuit breaker after it has been opened, if the ground-detecting relay is not functioning properly, even though the feeder circuit and the associated transformer are in sound condition and are normally operative. As a corollary object, the ground-detecting relay will open the network breaker if the relay should become non-operative or defective.

Where a network is supplied by two or more feeders, a sudden short-circuit on any one feeder may momentarily drop the voltage at different points of the system to a value that would ordinarily indicate a defective condition requiring disconnection of the network transformer and protector switch at that point. Selective control is obviously desirable, to obviate unnecessary false operations of network breakers.

To achieve such selective operation, I utilize the impedance inherent in each transformer connected to the network, to provide an additional voltage drop, upon the occurrence of a fault on the system, to permit selective relay response in controlling associated network breakers.

At each transformer and breaker unit, I therefore determine the voltage condition on the feeder side of each transformer in order to measure the voltage at a location furthest removed, on an impedance basis, from another feeder to the network. Consequently, upon the occurrence of a fault upon a remote feeder, the voltage of the local sound feeder will be higher, even though both feeders come from the same main source.

Another object of my invention is therefore to measure the value of a voltage quantity, preferably a phase-sequence voltage component, on the high-tension side of a network transformer to achieve selectivity of control upon occurrence of a fault on a feeder.

A further object of my invention is to provide a simple load compensating circuit, whereby the positive phase-sequence voltage on the high tension side of the network transformer may be measured from the low tension side of the transformer, as a step in determining the sound condition of the transformer and of the feeder, in order to control the opening of the network circuit breaker to disconnect the transformer from the network system upon the occurrence of phase-to-phase or three phase fault conditions, and to provide selectivity in determining fault locations to control the opening of the proper breaker.

Another object of my invention is to provide a simplified form of protective apparatus for a network system, that shall provide protection of the system at a relatively low cost compared to the cost of the highly sensitive types of protective equipment heretofore employed.

Figure 2:
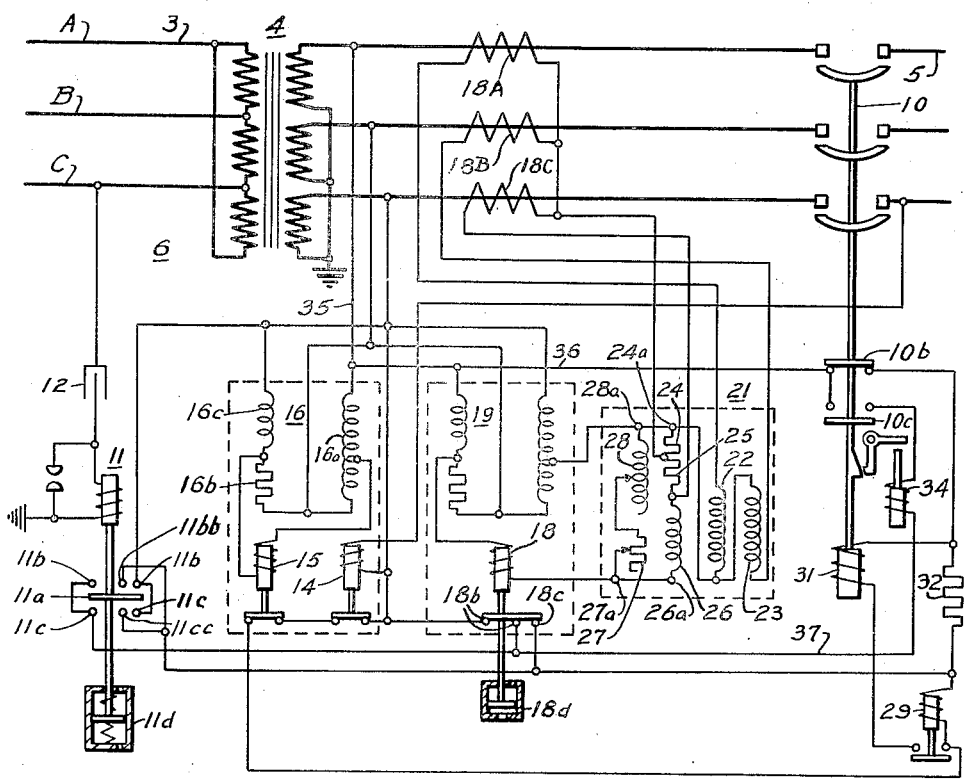

The arrangement of the simplified equipment to provide the protection for a network system in accordance with the principles of my invention is illustrated in the accompanying diagrams, in which Figure 1 is a simple single line diagram of a network system with several network units, of a transformer and a circuit breaker, supplied from two or more feeder circuits; and Fig. 2 is a diagram of one network unit of a transformer and a circuit breaker with the associated control equipment therefor.

As shown in the diagram of Figure 1, a polyphase grounded-neutral medium-voltage source 1, which may be a three phase generating station or substation bus, is connected by means of a feeder circuit breaker 2 to a feeder 3. The feeder circuit breaker 2 is equipped with the usual control apparatus for causing it to open in the event of a fault on the feeder 3.

A plurality of banks of transformers 4, which may be of the normal impedance type commonly employed for such networks, are connected to the feeder 3, for supplying power to a low-voltage polyphase network 5, in accordance with the usual practice. The banks of transformers 4 for a three phase system are preferably connected in delta on the feeder or high-voltage side, and in star, with neutral grounded, on the network side, but may be connected in other ways familiar to those skilled in the art. A plurality of network protectors 6 are interposed between the transformer banks 4 and the network 5 in the usual manner, and the network 5 is supplied from the source 1, or also from other sources, by means of other feeders, as indicated by the additional source 7 and the feeder 8 therefrom.

Referring to the diagram of Fig. 2, which shows a network protector 6, associated with a delta-star transformer bank 4, the network protector 6 consists of a network circuit breaker 10, and suitable control apparatus for the network circuit breaker 10.

Such control apparatus comprises a ground-detecting relay 11 suitably connected to a feeder; a phasing voltage relay 14; a negative phase-sequence voltage relay 15, and a positive phase-sequence under-voltage relay 13. The ground relay 11 may be connected by means of a capacitor 12 to a high-voltage terminal of the transformer bank 4. The relay 11 may be of the electrostatic type and is provided with a movable contact member 11a, main front contact members 11b and an auxiliary front contact 11bb, and main back contact members 11c and an auxiliary back contact member 11cc. This relay is so designed that the movable contact member 11a engages the front contact members 11b and 11bb in response to a voltage condition corresponding to or exceeding approximately 140% of the normal line-to-neutral voltage of the feeder 3, and engages the back contact members 11c and 11cc in response to an under-voltage condition corresponding to or less than approximately 30% normal line-to-neutral voltage. At normal line-to-neutral voltage, the movable contact member floats between both sets of contacts, but out of engagement with them.

A time delay element is provided on relay 11, and is shown as a dashpot 11d, which in this application may provide a delay of approximately one second in the movement of the relay in either direction.

The voltage responsive phasing relay 14 and the negative phase-sequence voltage relay 15 are provided for preventing the closure of the switch 10 in the event of an abnormal relationship between the feeder and the network voltages but permitting closure during normal conditions.

The voltage responsive phasing relay 14 is connected across one pair of the main contact members of the associated network circuit breaker 10, and is designed to open its contacts when the voltage across it equals or exceeds approximately 140% of normal line-to-neutral voltage of the low-voltage network and to close its contacts at approximately 115% or less of the normal line-to-neutral voltage. The purpose of this relay is to prevent the switch 10 from closing in the event that all three conductors of the feeder have been rotated 120° or 240°, but in proper phase rotation, in repairing a feeder fault.

The negative phase-sequence voltage relay 15 is connected to a negative phase-sequence voltage filter 16 that is energized in accordance with the negative symmetrical components of the polyphase voltage appearing across the secondary terminals of the transformer bank 4. This relay prevents closure if any two of the feeder conductors have been transposed.

The negative phase-sequence voltage filter 16 is preferably of the type disclosed in the U. S. Patent of B. E. Lenehan, No. 1,936,797, and comprises two voltage producing circuits, one circuit consisting of an auto-transformer 16a having a 40% tap, and the other circuit consisting of a resistor 16b and a reactor 16c, having a combined lagging phase angle of 60°. The impedance of the resistor 16b and reactor 16c are so related that the voltage appearing across the resistor 16b is equal to 40% of the total voltage impressed upon the resistor 16b and the reactor 16c in series, and the resistor voltage lags the total voltage by a phase angle of 60°. With this arrangement, the voltage impressed upon the negative phase-sequence voltage relay 15, when connected as shown, is proportional to the negative symmetrical components of the voltage applied to the terminals of the filter 16, as explained in the above-mentioned Lenehan patent.

The negative phase-sequence voltage relay 15 is designed to pick up when the negative sequence voltage is approximately 25% of the normal line-to-neutral voltage, and to drop out at 15% of normal line-to-neutral voltage. If any two conductors of the feeder 3 should have been transposed in repairing a feeder fault, a negative phase-sequence voltage of considerably higher value than 25% normal positive voltage would be impressed upon the negative phase-sequence voltage relay 15, and the relay would pick up and open its contacts. The relay 15 also operates in the event that any single feeder conductor has been left open in repairing a feeder fault. The case of two conductors of the feeder 3 being open need not be provided for, as no short-circuit would occur upon closure of a network protector breaker 10 under those conditions. A further treatment of this phasing unit may be found in my copending application, Serial No. 128,203, filed February 27, 1937. This application has matured into Patent 2,162,516, dated June 13, 1939.

In order to trip the network breaker in case a phase-to-phase or three phase fault occurs on the feeder 3, the undervoltage relay 18 is provided to measure the positive phase-sequence voltage on the primary side of the transformer 4, through a positive phase-sequence filter 19 connected to the secondary or low-tension side of the transformer 4, and with suitable compensation for the transformer resistance and reactance to positive phase-sequence quantities.

The positive phase-sequence filter 19 is similar to the negative phase sequence filter 16, and is composed of equivalent elements as explained in the aforesaid Lenehan patent. The change in the selective filtering action is established by reversing the connections between the filter 19 and the conductors of phases A and C, as compared with the connections of the negative phase-sequence filter 16 to the conductors A and C.

In order to enable the voltage relay 18 to measure the positive phase-sequence voltage on the high-tension side of the network transformer, from the low-tension side, through the filter 19, suitable compensation in that measured quantity is provided to compensate for the positive phase-sequence resistance and positive phase-sequence reactance of the network transformer 4. Such compensation is provided through three current transformers 18A, 18B and 18C, located on the secondary, or low-tension, side of the transformer, between the transformer 4 and the circuit breaker 10, and a positive phase-sequence current filter 21 comprising two line-phase impedances 22 and 23, and a third line-phase impedance circuit including resistors 24 and 25 and a reactor 26; and through a load-compensator, a circuit including a variable resistor 27 and a variable reactor 28, and energized by the positive phase-sequence current from filter 21.

The characteristics of the compensator elements 26 and 27 are selectively adjusted to correspond to the positive phase-sequence resistance and the positive phase-sequence reactance of the network transformer 4. Those positive phase-sequence resistance and reactance values provide a load compensating voltage of proper quantity and angular relation to modify the positive phase-sequence voltage impressed upon the coil of low-voltage relay 18 from the positive phase-sequence voltage filter 19, in accordance with the positive phase-sequence current as measured by filter 21.

The positive phase-sequence current filter 21 is described and claimed in a co-pending application of Bernard E. Lenehan, Serial No. 187,510, filed January 28, 1938, entitled Phase-sequence filters, and assigned to the assignee of this application. This application has matured into Patent No. 2,161,829.

For the purpose of this application it is sufficient to set forth one group of relative values for the several elements of the filter 21 to derive a positive phase-sequence current quantity through the filter 21.

Resistor 24 is pure resistance of a value $R/3$. Resistor 25 is pure resistance of a value $2R/3$. The impedance elements 22, 23 and 26 are designed to have a substantially pure mutual inductance of each element 22 or 23 to element 26 of a value $jR/\sqrt{3}$ where $j$ represents the 90° rotational vector operator $\sqrt{-1}$.

The positive phase-sequence current is derived, through the filter 21, from points 24a and 26a. That current quantity flows through the compensator circuit including the adjustable resistor 27 and the adjustable reactor 28 that are adjusted to the corresponding values of resistance and of reactance of the transformer 4 to positive phase-sequence currents.

The positive phase-sequence current through the compensator circuit establishes a voltage drop between junctures 27a and 28a. That voltage is introduced into the circuit of the winding of relay 18, and modifies the positive phase-sequence voltage, derived from the filter 19 and supplied to the relay 18, to compensate for the equivalent voltage drop due to the impedance of the transformer. The positive sequence current component from filter 21 is the one that is in phase with the positive sequence voltage component derived from filter 19, at unity power factor.

Relay 18, therefore, thus measures the positive phase-sequence voltage on the high-tension side of the transformer 4 from the low-tension side of the transformer 4, and thus determines whether the feeder is in sound energy-delivering condition, before and while the transformer 4 is connected to the network.

While the feeder 3 is sound, the relay 18 will be substantially fully energized. Upon the occurrence of a two phase or three phase short circuit on the feeder the positive phase-sequence voltage will drop to a value below the setting of relay 18, and the relay will close its contacts. The setting of the relay may be adjusted to permit drop-out for contact closure at about 70% of normal positive phase-sequence voltage.

In order to guard against a false operation of relay 18 in case of a sudden momentary drop in the voltage of the system, as reflected at relay 18, but caused by a short-circuit on another feeder from the same station source, the relay 18 is provided with a time delay device 18d, illustrated as a dash-pot, operative only to delay contact closure. The time delay may be one or two seconds.

If, while the feeder circuit 3 was sound, and the phasing relay 14 and the negative sequence relay 15 deenergized to close their contacts, the circuit of relay 18 should become open, or the relay 18 should become otherwise non-operative, relay 18 would drop out and close its main contacts 18b. Pumping of the breaker would result, due to relays 14 and 15 energizing the closing coil circuit while relay 18 energized the trip coil circuit.

To prevent such pumping, relay 18 is provided with an auxiliary contact 18c to cooperate with the contacts of relays 14 and 15 to bridge and short-circuit the closing control relay 29, to prevent its energization by relays 14 and 15.

The operation of the system herein described may be set forth as follows. Normally, the movable contact 11a of the relay 11 floats between its two sets of contacts without engaging any contact. When the voltage across this relay falls to or below approximately 30% of normal line-to-neutral voltage, the movable contact 11a drops to engage the three fixed contacts 11c and 11cc. Should the voltage across the relay rise to or above approximately 140% of normal line-to-neutral voltage, the movable contact 11a picks up to engage the three fixed contacts 11b and 11bb. In either case the trip coil 34 is energized to trip the circuit breaker 10. This is because the pair of contacts 11b and the pair of contacts 11c independently complete the tripping circuit.

At the same time one of the auxiliary contacts 11bb or 11cc together with one of the associated main contacts 11b or 11c of the relay 11 complete a short-circuit across the operating coil of the relay 29, and prevent reclosing of the circuit breaker 10 until the movable contact 11a returns to its normal floating position and deenergizes the trip coil 34. The auxiliary contacts, therefore, prevent pumping of the circuit breaker in the event that the movable contact 11a fails to clear one of its sets of contacts.

Both relays 11 and 18 have time delays which prevent tripping of the circuit breaker unless a tripping condition exists for the duration of the time interval for one of the relays. This reduces the possibility of a sound feeder being disconnected because of a fault occurring on another feeder. The time delay permits the faulty feeder to be disconnected from the source before the network circuit breaker 10 can be tripped.

If the condition of the feeder is otherwise normal and sound, and if the transformer is also sound, and the conductors are not transposed or rotated from normal phase relationship to the network conductors, the voltages impressed upon the negative phase-sequence filter will be relatively normal, and, the negative phase-sequence component of the voltage will be less than 15% of normal line-to-neutral voltage for which the negative phase-sequence relay 15 is adjusted to operate. The conditions being normal, the relay 15 will drop out to close its back contacts which are connected in series with the back contacts of the cooperating phasing relay 14, whose coil is connected across the C-phase terminals or conductors of the network circuit breaker. This phasing relay 14 is adjusted to have a pick-up setting of 140% of normal line-to-neutral voltage and a drop-out setting of 115% of normal line-to-neutral voltage. This phasing relay will operate to open its contacts if the conductors are phase rotated, from normal, even though they are in proper phase rotation.

The contacts of the negative phase-sequence relay 15 and the contacts of the phasing relay 14 are connected in series to control the energizing circuit of a closing control relay 29 that controls the energizing circuit to the closing coil 31 for the circuit breaker 10. The circuit of the operating coil of the control relay 29 includes a limiting resistor 32 to limit the current in that circuit when the operating coil of the control relay 29 is short-circuited through the contacts of the relay 18 or the ground relay 11.

The energizing circuit for the control relay 29 is completed through a back contact 10b on the circuit breaker 10, so that the circuit for that control relay 29 may be opened to deenergize the relay 29 when the breaker is moved to final closed position. In its closed position, the circuit breaker 10 closes an auxiliary front contact 10c, through which its trip coil 34 may be energized to open the breaker. The trip circuit may be traced from main circuit conductor A through conductors 35 and 36, the auxiliary contact 10c, the trip coil 34, conductor 37 and the contacts of ground relay 11 or under-voltage relay 18 to main conductor C.

If a ground fault should occur on the feeder 3, as at point X in Fig. 1, the feeder main breaker 2 would trip open as controlled by associated local protective equipment (not shown). In response to this grounded condition, all of the network protectors 6 would trip open through operation of ground relays 11 to completely disconnect the faulted feeder 3.

If, in repairing the feeder fault, any two of the conductors of the feeder 3 should be transposed, or if all three feeder conductors should be rotated 120° or 240°, or if one conductor of the feeder should be left open, the circuit breaker 10 would not be reclosed. The rotation of the feeder conductors would be detected by the phasing relay 14 which would be energized by the out-of-phase voltage across one pair of the circuit breaker contacts, and relay 14 would open its contacts to hold the circuit of the closing control relay 29 open, and would thus prevent operation of that relay 29 and energization of the closing coil 31 until the phase rotated condition of the feeder conductors were corrected.

Similarly, negative sequence relay 15 would detect a transposed conductor condition and would hold its contacts open to prevent energization of the control relay 29, and thereby prevent closure of the circuit breaker 10.

The open-phase condition of one of the feeder conductors would also be detected by the negative phase-sequence voltage relay 15 which would be sufficiently energized under that condition to open its contacts to hold the circuit of the closing control relay 29 open and deenergized.

So long as conditions in the feeder are normal, and the feeder is free of any two phase or three phase short-circuit condition, the positive phase-sequence relay 18 is sufficiently energized to open its contacts to prevent energization of the trip coil of the circuit breaker, so that the breaker will not be tripped open. By means of the compensator 21, the voltage impressed upon the operating coil of the positive phase-sequence relay 18 is made to correspond to the value of the positive phase-sequence voltage on the high tension side of the transformer 4.

For manual operation of the feeder circuit breaker 2, one of the feeder circuit conductors, such as conductor C, may be provided with a manually controlled switch 2a for grounding the conductor C directly or through an impedance.

If a fault occurs on the network 5, the fault is burned off in the usual manner. As the impedance of a network transformer, such as shown at 4, is invariably high, as compared to the impedance of a feeder circuit, such as feeder 3, the feeder voltage is not greatly reduced in the event of any form of network fault. In the case of the most severe network faults, such as phase-to-phase or three phase short-circuits close to the transformers, the feeder voltage may fall to a value of the order of 50% of normal and the positive sequence voltage of the feeder to about 80% of normal. However, as the ground relays 11 trip on under-voltage conditions only below 30% of normal, none of these relays would operate, and all the protectors 6 would remain closed.

Thus, by the provision of the auxiliary contacts 11cc on the ground relay 11, the closing control relay 29 is prevented from operating to energize the closing coil 31 to close the network breaker, in case the relay 11 should be non-operative, for any reason, while the feeder is otherwise sound. Similarly, auxiliary contact 18c on relay 18 prevents closure of the breaker even if the feeder is sound, so long as relay 18 is defective and non-operative for any reason.

If, for example, a three phase or phase-to-phase fault should occur at location X on feeder 8, Fig. 1, and both feeders 3 and 8 were connected to the same source, the entire system voltage would momentarily drop.

However, in view of the impedances of the transformers between feeder 8 and the network, the network impedance, and the impedance of a transformer 4 connected to feeder 3, as in Fig. 2, the voltage on feeder 3 would be relatively high, and relay 18 energized as if from feeder 3, through its compensator circuit, would hold up to prevent tripping the associated breaker.

By measuring the voltage on the high side of transformer 4, relay 18 has the advantage of the additional transformer impedance in achieving selectivity due to voltage gradients in the system during fault conditions.

By means of the load compensator 21, the conditions on the high tension side of the transformer are determined and utilized as a guide in controlling the relay 18.

Although the filters 19 and 21 may be designed to filter negative sequence quantities and the relay 18 designed to pick up and close its contacts when the negative sequence voltage referred to the feeder 3 rises above a predetermined value, I prefer the positive sequence arrangement for the reason that the latter is effective in the case of a balanced three phase fault.

I do not intend that the present invention shall be restricted to the specific structural details, arrangement of parts, or circuit connections, herein set forth, as various modifications thereof may be effected without departing from the spirit and scope of my invention. I desire, therefore, that only such limitations shall be imposed as are indicated in the appended claims.

I claim as my invention:

1. In a network system having a source of electrical energy, a distribution circuit and transformer coupling means for operatively connecting said distribution circuit for energization from said source, said coupling means having substantial impedance; control means for disconnecting said distribution circuit from said source, and compensated means for energizing said control means for a disconnecting operation from a first side of said coupling means with an energization corresponding to that obtainable from a second side of said coupling means, said control means being effective only if its disconnecting energization continues for a predetermined substantial time.

2. In a network system having a source of electrical energy, a distribution circuit and transformer coupling means for operatively connecting said distribution circuit for energization from said source, said coupling means having substantial impedance; control means for interrupting and reestablishing the connection between said distribution circuit and said source, said control means including a circuit interrupting device for said distribution circuit and relay means having a substantial time delay for controlling the tripping of said circuit interrupting device, and energizing means for energizing said relay in accordance with an electrical quantity present on the source side of said coupling means, said energizing means being connected for energization from the distribution circuit side of said coupling means.

3. In a network system having a source of electrical energy, a distribution circuit and transformer means for operatively connecting said distribution circuit for energization from said source, said transformer means having substantial impedance; control means having a substantial time-delay for disconnecting said distribution circuit from said source, and compensated means for energizing said control means from a first side of said transformer means with a voltage corresponding to a voltage obtainable from a second side of said transformer means.

4. In a polyphase network system having a source of electrical energy, a distribution circuit and coupling means for operatively connecting said distribution circuit for energization from said source, said coupling means having substantial impedance; control means for interrupting and reestablishing the connection between said distribution circuit and said source, said control means including a circuit interrupting device for said distribution circuit and relay means for controlling the operation of said circuit interrupting device, and energizing means for energizing said relay in accordance with a symmetrical component of an electrical quantity present on the source side of said coupling means, said energizing means being connected for energization from the distribution circuit side of said coupling means.

5. In a polyphase network system having a source of electrical energy, a distribution circuit and coupling means for operatively connecting said distribution circuit for energization from said source, said coupling means having substantial impedance; control means for interrupting and reestablishing the connection between said distribution circuit and said source, said control means including a circuit interrupting device for said distribution circuit and means for controlling said circuit interrupting device in accordance with a symmetrical component of an electrical quantity derived from the distribution circuit side of said coupling means, and means for adding to said symmetrical component for controlling said device a second symmetrical component of the same sequence which is proportional to the symmetrical component of the same sequence consumed by said coupling means.

6. In an electrical distribution system, a source of polyphase energy, transformer means, a polyphase circuit connected for energization from said source through said transformer means, a circuit interrupting device for controlling the connection between said polyphase circuit and said source, a symmetrical component voltage filter and a symmetrical component current filter of the same sequence both connected for energization from the secondary circuit of said transformer means, impedance means energized from the output of said current filter, said impedance means having an impedance capable of producing a voltage drop when energized by current from said current filter, and means controlled by the sum of the output of said voltage filter and the voltage drop across said impedance means for controlling said circuit interrupting device.

7. In a network system, a source of polyphase energy, a transformer, a polyphase circuit connected for energization from said source through said transformer, a circuit breaker having closing means for controlling the connection between said polyphase circuit and said transformer, a positive sequence voltage filter energized from the secondary circuit of said transformer, a positive sequence current filter energized from the secondary side of said transformer, a compensator energized from said current filter and having an impedance to positive sequence current which corresponds to that of said transformer, said compensator being connected in the output circuit of said voltage filter for producing a resultant voltage corresponding to the positive sequence voltage on the primary circuit of said transformer, and means for preventing operation of said closing means while said resultant voltage remains below a predetermined value.

8. In a network system, a source of polyphase energy, a transformer, a polyphase circuit connected for energization from said source through said transformer, a circuit breaker for controlling the connection between said polyphase circuit and said transformer, a positive sequence voltage filter energized from the secondary circuit of said transformer, a positive sequence current filter energized from the secondary side of said transformer, a compensator energized from said current filter and having an impedance to positive sequence current which corresponds to that of said transformer, said compensator being connected in the output circuit of said voltage filter for producing a resultant voltage corresponding to the positive sequence voltage on the primary side of said transformer, and means controlled by said resultant voltage for tripping said circuit breaker.

9. In a network system, a source of polyphase energy, a transformer, a polyphase circuit connected for energization from said source through said transformer, a circuit breaker having closing means for controlling the connection between said polyphase circuit and said transformer, a positive sequence voltage filter energized from the secondary circuit of said transformer, a positive sequence current filter energized from the secondary side of said transformer, a compensator energized from said current filter and having an impedance to positive sequence current which corresponds to that of said transformer, said compensator being connected in the output circuit of said voltage filter for producing a resultant voltage corresponding to the positive sequence voltage on the primary side of said transformer, means including a relay controlled by said resultant voltage for tripping said circuit breaker, and means for preventing operation of said closing means while said relay is in tripping condition.

10. In a network system, a source of polyphase energy, a transformer, a polyphase circuit connected for energization from said source through said transformer, a circuit breaker for controlling the connection between said polyphase circuit and said transformer, a positive sequence voltage filter energized from the secondary circuit of said transformer, a positive sequence current filter energized from the secondary side of said transformer, a compensator energized from said current filter and having an impedance to positive sequence current which corresponds to that of said transformer, said compensator being connected in the output circuit of said voltage filter for producing a resultant voltage corresponding to the positive sequence voltage on the primary side of said transformer, and means independently controlled by said resultant voltage and by a line-to-ground voltage on the primary side of said transformer for tripping said circuit breaker.

11. In a network system, a source of polyphase energy, a transformer, a polyphase distribution circuit connected for energization from said source through said transformer, a circuit breaker having closing means for controlling the connection between said polyphase circuit and said transformer, a positive sequence voltage filter energized from the secondary circuit of said transformer, a positive sequence current filter energized from the secondary side of said transformer, a compensator energized from said current filter and having an impedance to positive sequence current which corresponds to that of said transformer, said compensator being connected in the output circuit of said voltage filter for producing a resultant voltage corresponding to the positive sequence voltage of the primary circuit of said transformer, means independently controlled by said resultant voltage and by a line-to-ground voltage on the primary side of said transformer for tripping said circuit breaker, and phasing means for permitting closure of said circuit breaker only when the voltages across its contacts assure a flow of energy from said source to said distribution circuit.

12. In a distribution system, a distribution circuit, a plurality of feeder circuits, coupling means for operatively connecting each of said feeder circuits to said distribution circuit, each of said coupling means having substantial impedance, a circuit interrupting device for each of said feeders for disconnecting the associated feeder from said distribution circuit, trip means for each of said circuit interrupting devices, and means for energizing each of said trip means from said distribution circuit in accordance with a voltage present on the associated feeder, each of said trip means being effective only if a tripping condition exists for a predetermined substantial time.

13. In a polyphase network system having a source of electrical energy, a distribution circuit and coupling means for operatively connecting said distribution circuit for energization from said source, said coupling means having substantial impedance; control means for interrupting and reestablishing the connection between said distribution circuit and said source, said control means including a circuit interrupting device for said distribution circuit and means for tripping said circuit interrupting device responsive to a symmetrical component of an electrical quantity derived from the distribution circuit side of said coupling means, and means for adding to said symmetrical component for controlling said device a second symmetrical component of the same sequence which is proportional to the consumption in said coupling means of a symmetrical component of the same sequence, said tripping means being effective only if the resultant of said symmetrical components is of tripping magnitude for a predetermined time interval.

JOHN S. PARSONS.